(12) United States Patent
Stumpfl et al.

(10) Patent No.: US 9,229,436 B2
(45) Date of Patent: Jan. 5, 2016

(54) METHOD FOR DETERMINING THE SETPOINT CONTACT PRESSURE VALUE FOR CONVEYING A WELDING WIRE OF A WELDING DEVICE AND CORRESPONDING WELDING DEVICE

(75) Inventors: Christian Stumpfl, Taufkirchen (AT); Andreas Hummelbrunner, Ried im Traunkreis (AT)

(73) Assignee: Fronius International GmbH, Pettenbach (AT)

( * ) Notice: Subject to any disclaimer, the term of this patent is extended or adjusted under 35 U.S.C. 154(b) by 379 days.

(21) Appl. No.: 13/989,504

(22) PCT Filed: Apr. 25, 2012

(86) PCT No.: PCT/AT2012/000111
§ 371 (c)(1), (2), (4) Date: May 24, 2013

(87) PCT Pub. No.: WO2012/162709
PCT Pub. Date: Dec. 6, 2012

(65) Prior Publication Data
US 2013/0253728 A1 Sep. 26, 2013

(30) Foreign Application Priority Data
May 27, 2011 (AT) .................................. A 775/2011

(51) Int. Cl.
*G06F 19/00* (2011.01)
*G05D 16/00* (2006.01)
(Continued)

(52) U.S. Cl.
CPC ................ *G05B 11/01* (2013.01); *B23K 9/125* (2013.01); *B23K 9/1336* (2013.01)

(58) Field of Classification Search
CPC ........ B23K 9/0953; B23K 9/12; B23K 9/124; B23K 9/133
USPC ........... 700/114, 152, 160, 301; 219/136, 137
See application file for complete search history.

(56) References Cited

U.S. PATENT DOCUMENTS 6,831,251 B1 12/2004 Artelsmair et al.
7,026,575 B2 4/2006 Wimroither
(Continued)

FOREIGN PATENT DOCUMENTS

AT      407 020 B     11/2000
AT      007 924        11/2005
(Continued)

OTHER PUBLICATIONS

International Search Report of PCT/AT2012/000111, date of mailing Sep. 19, 2012.
(Continued)

*Primary Examiner* — Ronald Hartman, Jr.
(74) *Attorney, Agent, or Firm* — Collard & Roe, P.C.

(57) ABSTRACT

The invention relates to a method for determining a setpoint value ($p_{set}$) for the contact pressure of conveying rollers (29, 30) of at least one device (8) for conveying a welding wire (9) of a welding device (1), and a corresponding welding device (1). In order to improve the determination of the setpoint value ($p_{set}$) for the contact pressure of each conveying device (8), data of the defined parameters ($P_i$) together with data from additional parameters ($P_z$) relating to the configuration of the welding device (1) are stored in a database (26) together with the setpoint values ($p_{set}$), determined in each case empirically, of the contact pressure or a calculation rule for calculating the respective setpoint values ($p_{set}$) of the contact pressure, and the setpoint value ($p_{set}$) of the contact pressure of each conveying device (8) is determined empirically or by calculation depending on this defined parameters ($P_i$) and additional configuration parameters ($P_z$) from the database (26) and is indicated on at least one display (28).

21 Claims, 3 Drawing Sheets

(51) Int. Cl.
*B23K 9/00* (2006.01)
*G05B 11/01* (2006.01)
*B23K 9/12* (2006.01)
*B23K 9/133* (2006.01)

(56) References Cited

U.S. PATENT DOCUMENTS

| | | | |
|---|---|---|---|
| 7,220,941 B2 * | 5/2007 | Niedereder et al. | 219/132 |
| 2005/0145610 A1 * | 7/2005 | Nishikawa et al. | 219/130.01 |
| 2007/0151964 A1 | 7/2007 | Artelsmair et al. | |
| 2007/0241161 A1 | 10/2007 | Kronegger et al. | |
| 2008/0296278 A1 * | 12/2008 | Meckler | 219/137.71 |
| 2009/0026188 A1 * | 1/2009 | Schorghuber | 219/137 PS |
| 2009/0302015 A1 | 12/2009 | Feitzlmaier et al. | |
| 2009/0313549 A1 * | 12/2009 | Casner et al. | 715/740 |
| 2011/0220630 A1 | 9/2011 | Speilman et al. | |
| 2012/0248084 A1 * | 10/2012 | Romenesko et al. | 219/137.7 |

FOREIGN PATENT DOCUMENTS

| | | |
|---|---|---|
| CN | 1555302 A | 12/2004 |
| CN | 1964814 A | 5/2007 |
| CN | 101454111 A | 6/2009 |
| CN | 101700598 A | 5/2010 |
| CN | 101702899 A | 5/2010 |
| EP | 1 755 817 | 2/2007 |
| JP | 2001 150134 | 6/2001 |
| JP | 2010 099677 | 5/2010 |
| WO | 2007/137310 A1 | 12/2007 |

OTHER PUBLICATIONS

Austrian Office Action in A 775/2011 dated Dec. 5, 2011, with English translation of relevant parts.
Chinese Office Action dated Feb. 15, 2015 in Chinese Application No. 201280004511.X with English translation of relevant parts.

* cited by examiner

Fig.4

METHOD FOR DETERMINING THE SETPOINT CONTACT PRESSURE VALUE FOR CONVEYING A WELDING WIRE OF A WELDING DEVICE AND CORRESPONDING WELDING DEVICE

CROSS REFERENCE TO RELATED APPLICATIONS

This application is the National Stage of PCT/AT2012/000111 filed on Apr. 25, 2012, which claims priority under 35 U.S.C. §119 of Austrian Application No. A 775/2011 filed on May 27, 2011, the disclosure of which is incorporated by reference. The international application under PCT article 21(2) was not published in English.

The invention relates to a method for determining a setpoint value for the contact pressure of conveying rollers of at least one device for conveying a welding wire of a welding device, wherein the setpoint value of the contact pressure is determined empirically or by calculation depending on defined parameters and is adjusted on the at least one conveying device.

The invention further relates to a welding device having at least one device comprising conveying rollers for conveying a welding wire, wherein a setpoint value of the contact pressure of the conveying rollers of each conveying device can be determined empirically or by calculation depending on defined parameters and can be adjusted on the at least one conveying device.

In welding methods with melting welding wire said wire is conveyed from a wire supply, for example a wire coil or a wire drum, to the welding torch via corresponding conveying devices, in order to form there a corresponding welded seam for connecting two work pieces. In order to convey the welding wire, typically two conveying rollers are used, between which the welding wire is pinched. At least one of the conveying rollers is driven. Typically a suitable groove for receiving the welding wire is provided on the conveying rollers. The shape of the groove can be designed variously, such as trapezoidal or semicircular, depending on the welding wire material. Depending on the welding wire the number and arrangement of the conveying devices may vary. For example, one conveying device for conveying the welding wire can either be arranged in the welding torch or in the section of the wire supply, but can also be arranged in both the welding torch and the section of the wire supply and in between, if need be. In particular, in present-day welding methods, such as CMT (Cold Metal Transfer) welding, in which conveyance of welding wire takes place against the usual direction towards work piece temporarily, several conveying devices per welding direction are common.

For ideal conveyance of the welding wire it is required to appropriately adjust the pressure, with which the welding wire is pinched between the conveying rollers of the conveying device. Ideal setpoint values for contact pressure exist depending on material and diameter of welding wire and also on the properties and condition of conveying rollers of the conveying device. When the contact pressure is selected too low, the welding wire may slip through the conveying rollers and can not be conveyed to welding location at the desired speed. Thus, it may happen that too little welding wire is conveyed to the welding location. As a consequence, changes in the length of the arc and, thus, a deterioration in the welding quality may occur. In case of a too high contact pressure an unacceptable deformation of the welding wire may occur, which in turn results in problems with the conveyance of the welding wire and the welding.

AT 007 924 U1 for example describes a drive unit for conveying a welding wire, wherein the welding wire is pinched between two conveying rollers in the section of the welding torch, and wherein when driving one conveying roller, the so-called driving roller, a movement of the welding wire is achieved.

EP 1 755 817 E1 shows a device for conveying the welding wire incorporated in the welding torch, wherein to adapt the contact pressure to the material and diameter of the welding wire a pressurising medium is provided, which is elastically or plastically deformable, by which one conveying roller can be adjusted appropriately, to be able to adapt the contact pressure to the respective welding wire.

Typically, the selection and adjustment of the setpoint value of the contact pressure is made based on tables containing setpoints for the contact pressure, which were empirically determined depending on defined parameters, such as welding wire material, welding wire diameter and the type of conveying rollers, such as for example the shape and surface condition of the groove of conveying rollers. Corresponding setpoints for the contact pressure are determined empirically for all parameter combinations and entered into corresponding tables. Then the welder selects the ideal setpoint value for the contact pressure for the welding to be carried out by using a certain welding wire based on the tables and adjusts said value on the conveying device manually. For this purpose a handwheel with an appropriate scale is for example located on the conveying device, which is correspondingly turned until the value on the scale matches the tabular value for the setpoint value of the contact pressure. To simplify, not the contact pressure itself is typically selected, but a preferably single-figure numerical value matching the corresponding contact pressure. A corresponding table for typical welding properties or for that welding property the welding device is designed for, is glued to the conveying device, particularly onto a lid of the conveying device. Further tables the user needs to take from the specification or other sources, for example the Internet.

Apart from the high effort for selecting and setting the contact pressure traditional methods are also very prone to misadjustments by the welder.

Thus, the object of the present invention is the simplification and improvement of determination and specification of the setpoint of the contact pressure of the conveying rollers of a device for conveying a welding wire of a welding device, in order to also improve the welding quality by the ideally adjusted contact pressure. Prior art disadvantages are preferably to be avoided or at least be reduced.

The present object is solved in terms of the methods involved in that data of defined parameters together with data from additional parameters relating to the configuration of the welding device are stored in a database together with the setpoint values, determined in each case empirically, of the contact pressure or a calculation rule for calculating the respective setpoint values of the contact pressure, and the setpoint value of the contact pressure of each conveying device is determined empirically or by calculation depending on this defined parameters and additional configuration parameters from the database and is indicated on at least one display. Thus, said method is characterized in that in addition to the known influencing parameters (welding wire material, welding wire diameter, type of conveying rollers of conveying device, etc.) further influencing parameters, which consider the configuration of the welding device, are stored into a database together with the respective ideal values for the contact pressure of the conveying rollers of the conveying devices. By using a database instead of tables or charts significantly more influencing parameters can, thus, be used for selecting the ideal contact pressure, whereby the adjustment can still be better matched with particular situations, especially with the type of configuration of the welding device. Even in this case the ideal contact pressure of each conveying device is determined empirically, i.e. under laboratory conditions, and stored for each parameter combination. Of course a corresponding calculation rule for calculating the setpoint value of the contact pressure depending on all influencing parameters can be stored in the database instead of single values. No matter how the entry or selection of defined parameters and configuration parameters is done, the setpoint value of the contact pressure of the conveying rollers of each conveying device is in any case indicated to the welder, whereupon he is able to make the appropriate adjustments on the conveying devices. With the additional configuration parameters the plurality of possibilities of configurations of the welding device are considered and, thus, a better selection of the respective ideal contact pressure is achieved. With the method also the probability of misadjustments due to wrong assignments in tables or charts is reduced, since the welder substantially adjusts the present configuration of the application. While the number of applications remains unchanged the different tables and/or charts per application are, thus, omitted. The corresponding data of the database can also relatively rapidly and simply be updated or adapted and extended to new situations. The indication of the setpoint value of the contact pressure of each conveying device or of a corresponding equivalent numeric value can occur on one or more displays. Preferably, the display for the setpoint value of the contact pressure is located in close proximity to that respective conveying device, on which the adjustment of the contact pressure is made. Of course, even in case of several conveying devices only a single display may be arranged, on which the setpoint values for the contact pressure of all conveying devices are for example shown one after another. A significant advantage also lies in that in determining or indicating the setpoint value for the contact pressure also the actual values of the contact pressure can be considered during a welding. For example after a welding the value of the contact pressure indicated before can be changed or adjusted during a welding due to the actual values of the contact pressure occurred.

The data of the defined parameters and/or configuration parameters can be entered or selected via an input device. Thus, the input device, which can be formed by the usually present input/output device of the welding device, is used to adjust or select the defined parameters (e.g. welding wire material, welding wire diameter, etc.) and the configuration parameters (e.g. number and type of conveying devices, length of the hose package, etc.), whereupon the ideal setpoint value of the contact pressure of each conveying device is automatically determined from the database and indicated to the welder.

In addition or as an alternative the data of the defined parameters and/or configuration parameters can also be identified automatically. Thereby misadjustments by the welder can be avoided. Automatic identification of the respective defined parameters and/or configuration parameters can be performed in different ways. For example welding components can have unique identifications by means of which the configuration parameters can be identified. When said parameters are forwarded to the database, then a selection of the setpoint value of the contact pressure of the conveying device can automatically be made.

The material and the diameter of the welding wire and the type of the conveying rollers of the conveying device, if need be, are preferably used as defined parameters.

The number and positions of the conveying devices, the type, number and length of hose packages for guiding the welding wire and/or the type of the at least one conveying device, such as a 2-roll or a 4-roll drive, are preferably used as configuration parameters. The configuration parameters are supposed to contain all degrees of freedom in the configuration of the welding device, that have an influence on the selection of the ideal contact pressure of the conveying device. For example the length of the hose package has significant influence on which counterforce is applied on the conveying device and with which contact pressure the welding wire consequently needs to be pressed to achieve an ideal conveyance.

If according to a further feature of the invention the selected setpoint value of the contact pressure of each conveying device is corrected depending on a measured conveying speed of the welding wire, for example a measured motor current of the conveying device, the wear, especially of conveying rollers can be considered. Thus, ideal conveying conditions can further be achieved for a certain period of time despite wear. For example deviations from usual motor current of the driving motor of the conveying device are a sign of wear of the conveying rollers, for which reason the motor current can be used as an indicator for wear.

Exceeding or falling below threshold values of the measured wire conveying speed, for example of the measured motor current of the conveying device, can also be indicated optically or audibly, to refer to the wear of the conveying device and to enable the welder to prepare the replacement of the corresponding welding components, especially the conveying rollers.

A further improvement of the method can be achieved in that the setpoint value of the contact pressure of each conveying device is adjusted automatically. Automatic adjustment can for example be made by corresponding stepping motors or the like. By such an automatic adjustment misadjustments by the welder can be excluded.

The setpoint value of the contact pressure of each conveying device is preferably indicated in the form of a value between 0 and 9 on the at least one display. This simplifies the manual adjustment of the contact pressure and, furthermore, enables an adaptation to already existing conveying devices with default scales for the adjustment element for adjusting the contact pressure. Furthermore, in case of a single-figure display of the setpoint value of the contact pressure only one corresponding display, for example a seven-segment display, is required.

The present object is also solved by a welding device mentioned above, wherein a database is provided for storing the data of the defined parameters together with data of additional parameters relating to the configuration of the welding device together with the setpoint values of the contact pressure, determined in each case empirically, or a calculation rule for calculating the respective setpoints of the contact pressure, and at least one display is provided for the setpoint value of the contact pressure of each conveying device that is determined empirically or by calculation. For the advantages achieved thereby reference is made to the above description of the method for determining the setpoint value for the contact pressure.

Preferably an input device for entry or selection of the data of the defined or known influencing parameters and/or configuration parameters connected to the database is provided. As already mentioned above said input device can be formed by the already present input/output device of the welding device or a separate keyboard or a touchscreen or the like, by which the entry or selection of the data of the corresponding parameters is enabled.

When a device for automatic identification of the data of the defined parameters and/or configuration parameters connected to the database is provided, a manual selection of the data of the defined parameters and/or configuration parameters can at least partially be omitted and, thus, the determination of the setpoint value of the contact pressure can be simplified still further.

For example the identification device can be formed by a bar code reader. Thus, for example the material and the diameter of the welding wire can be included in the wire supply in the form of a bar code. Using a bar code reader the appropriate data can be forwarded to the database. Instead of bar codes also any different codes for defining parameter data contained in a RFID (Radio Frequency Identification) label and corresponding devices for reading out said codes can of course be provided. The configuration of the welding device can also be performed via a network connection, particularly an Ethernet connection, with which the individual components of the welding device (conveying device, welding device, welding torch, . . . ) are connected to each other and/or to the welding device.

As already mentioned above the material and the diameter of the welding wire and the type of the conveying rollers of the conveying device, if need be, can be stored in the database as defined parameters.

The number and positions of the conveying devices, the type, number and length of hose packages for guiding the welding wire and/or the type of the at least one conveying device, are stored in the database as additional configuration parameters.

When a unit for measuring the speed of the welding wire, for example a unit for measuring the motor current of the welding device, connected to the database is provided, the actual values of the welding wire conveyance can be considered and, thus, a regulation can be established. In this way the wear of the conveying device can be considered and the corresponding setpoint value of the contact pressure can be corrected depending on wear.

Via an optical or audible indicating device the exceeding or falling below threshold values of the measured wire conveying speed, for example of the measured motor current, can be indicated to advise the welder of the wear of the conveying device. The optical or audible indicating device does not necessarily need to be included in the welding device but can also be transferred by appropriate methods to another place, for example a welding office.

When each conveying device has a unit for automatic adjustment of the contact pressure, misadjustments by the welder can be avoided.

When the database is connected to a corresponding interface, the data of the database can also simply be updated or supplemented remotely. Established interfaces, such as for example interfaces to a network, particualarly the Internet, are especially suited as interfaces.

When each display for the setpoint value of the contact pressure of each conveying device is formed by a single-figure seven-segment display, the device can be designed very cost-efficiently and space-saving. This way the display can for example also be placed on the relatively small welding torch.

The present invention is explained in more detail with the help of the attached schematic drawings. In which.

Figure 1:
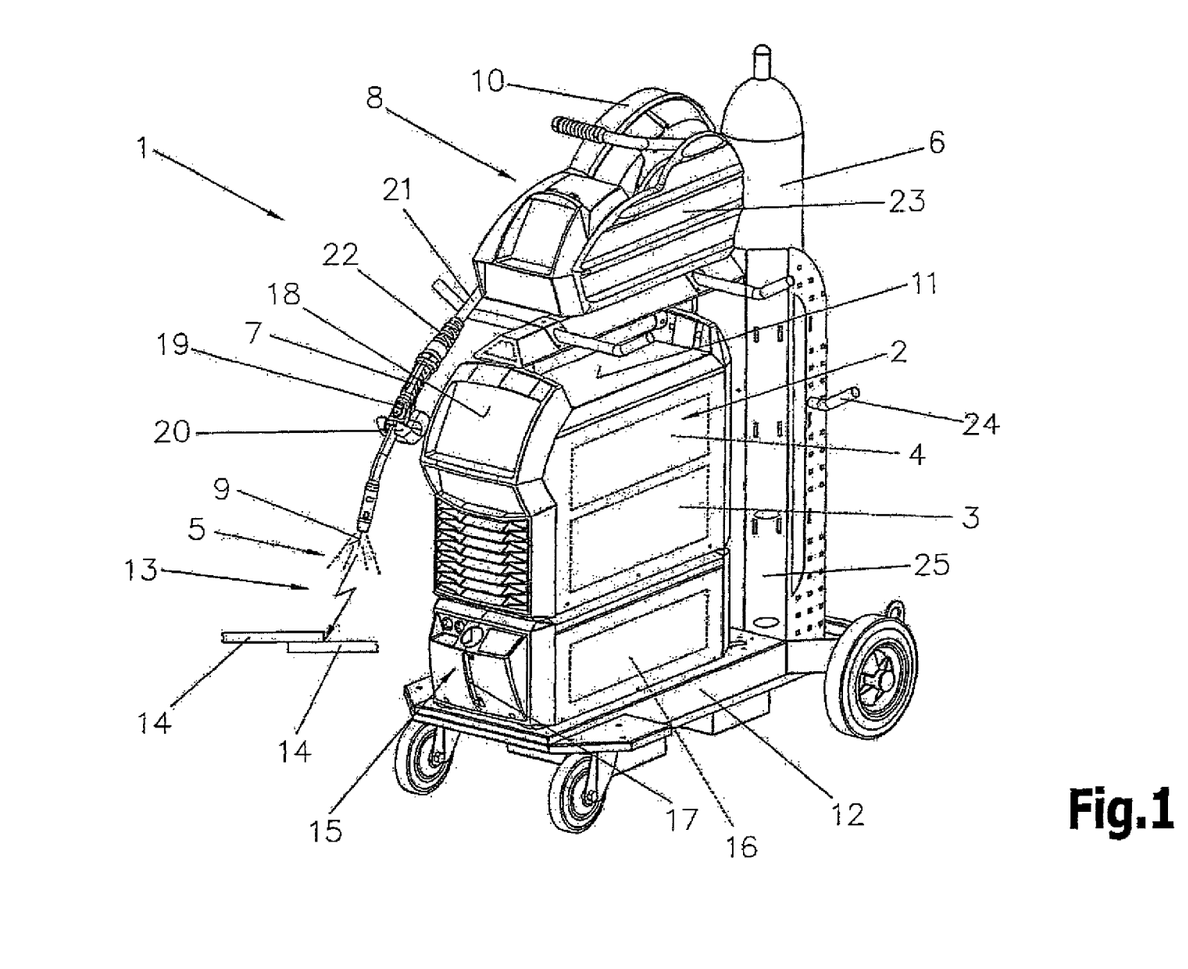
FIG. 1 is a schematic illustration of a welding device.

In FIG. 1 a welding device 1 for various processes or methods, such as MIG/MAG welding, WIG/TIG welding, electrode welding, twin wire/tandem welding, plasma or soldering processes, etc. is shown.

The welding device 1 comprises a power source 2 having a power element 3, a control device 4 and further components and cables not shown, such as a switchover element, control valves, etc. arranged therein. For example, the control device 4 is connected to a control valve, which is arranged in a supply line for a gas 5, especially a protective gas, such as $CO_2$, helium or argon and the like, between a gas tank 6 and a welding torch 7.

Furthermore, a further device 8 for conveying a welding wire 9 from a feed drum 10 or a wire reel into the section of welding torch 7 can also be actuated via control device 4, as for example usual in MIG/MAG welding. Of course the conveying device 8 can also be incorporated within welding device 1, particularly within housing 11 of power source 2, and not positioned as an additional device on a carriage 12 as shown in FIG. 1. The conveying device 8 for the welding wire 9 can also be mounted directly on welding device 1, wherein the housing 11 of power source 2 is formed on the surface thereof to receive the conveying device 8, so that carriage 12 can be omitted.

The welding wire 9 can also be supplied to the working position by the conveying device 8 outside the welding torch 7, wherein preferably a non-consumable electrode is arranged within the welding torch 7 as usual in WIG/TTG welding.

The power for creating an arc 13, particularly a working arc, between the electrode or the welding wire 9 and one work piece 14 formed of one or more parts is supplied via a welding cable (not shown) from the power element 3 of power source 2 to welding torch 7, particularly the electrode or welding wire 9. The work piece 14 to be welded is connected with power source 2 via a further welding cable (not shown) for further potential, particularly a ground cable, whereby an electric circuit can be created for a process via arc 13 or a plasma jet formed. Using a torch having an internal arc 13 (not shown) like with plasma torches) both welding cables are supplied to the torch, so that a respective electric circuit (not shown) can be created within the torch.

In order to cool welding torch 7 it can be connected via a cooling device 15 by interconnection of potential components, such as a flow controller, to a liquid reservoir, particularly a water reservoir 16 with a level meter 17. During initial operation of welding torch 7 the cooling device 15, particularly a liquid pump used for the liquid arranged in the water reservoir 16, is started, whereby a cooling of welding torch 7 is effected. As seen in the embodiment shown, the cooling device 15 is positioned on the carriage 12, followed by power source 2. The individual components of the welding device 1, i.e. power source 2, wire feed unit 8 and cooling device 15, are formed such that they have respective projections or recesses, so that they can be stapled or put on top of each other.

Further, welding device 1, particularly power source 2, has an input and/or output unit 18, by means of which unit various welding parameters, operation modi or welding programs of welding device 1 can be adjusted or selected and indicated.

Welding parameters, operation modi or welding programs adjusted with the help of that input and/or output unit 18 are forwarded to control device 4, and the individual components of the welding device 1 are then actuated, or setpoint values for regulating or controlling are provided from this device. Using an adequate welding torch 7 even adjustment procedures can be done via welding torch 7, whereto welding torch 7 is equipped with a welding torch input and/or output device 19. Preferably, welding torch 7 is connected to the welding device 1, particularly power source 2 or conveying device 8 via a data bus, particularly a serial data bus. In order to start the welding process the welding torch 7 has in most cases a start switch (not shown), so that by pressing said start switch the arc 13 can be ignited. In order to be protected from the heat coming from arc 13 the welding torch 7 can be equipped with a protective heat shield 20.

In the embodiment shown the welding torch 7 is connected to welding device 1 via a hose package 21, wherein the hose package 21 can be fastened on welding torch 7 via a bend protection 22. In the hose package 21 the individual cables, such as supply cable, cables for welding wire 9, for gas 5, for cooling circuit, for data transfer, etc. are arranged from welding device 1 to welding torch 7, whereas the ground cable is preferably connected to power source 2 separately. Preferably, the hose package 21 is connected to power source 2 or conveying device 8 via a coupling device, not shown, whereas the individual cables within hose package 21 are fastened with a bend protection on or in welding torch 7. In order to ensure an adequate stress relief of hose package 21 the hose package 21 can be connected to housing 11 of power source 2 or conveying device 8 via a stress relief unit (not shown).

Basically, in different welding methods or welding devices 1, such as WIG devices or MIG/MAG devices or plasma devices, not all components previously mentioned need to be used or employed. The welding torch 7 can also be designed as an air-cooled welding torch 7 and the cooling device 15 can be omitted. The welding device 1 is at least formed by power source 2, conveying device 8 and cooling device 15, if need be, wherein said components can also be arranged in a common housing 11. Still further parts or components, as for example a rub protection 23 on wire feed unit 8 or an optional support 24 on a holding device 25 for the gas storage 6, etc. can be arranged.

The embodiment of a welding device, shown in FIG. 1, is only one of many possibilities. In particular, welding devices 1 can vary regarding the supply of welding wire 9, the length of hose package 21, the type, position and number of conveying devices 8 for the welding wire 9, the presence of a wire buffer (not shown) and many more.

Figure 2:
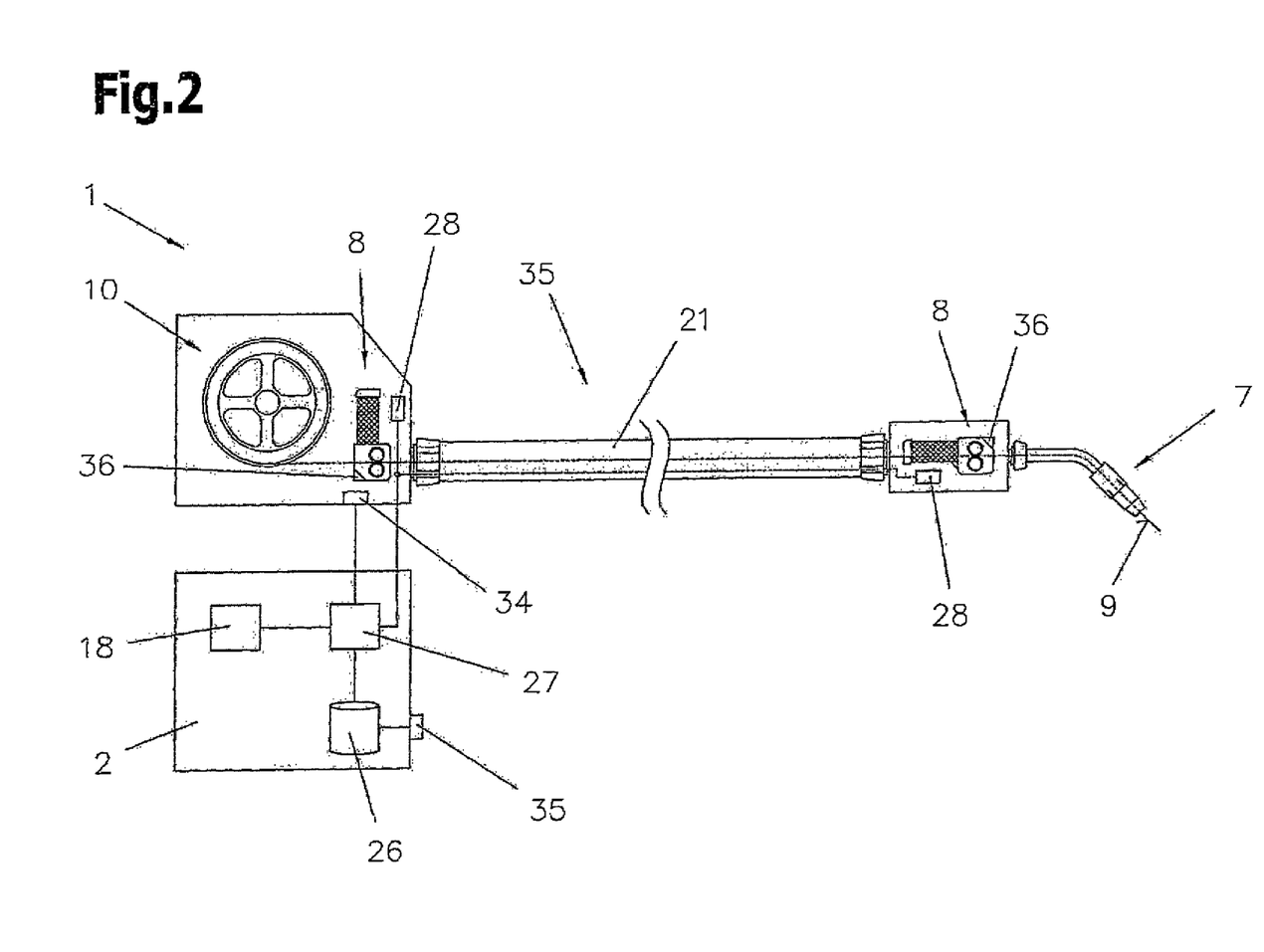
FIG. 2 is a schematic view of a welding device with the present determination of the setpoint value for the contact pressure of the conveying rollers.

FIG. 2 schematically shows a welding device 1 with the present function of the determination of the setpoint value $p_{set}$ of the contact pressure of a wire conveying device 8. In the embodiment shown a feed drum 10 is located above the power source 2 of the welding device 1, on which the welding wire 9 is rolled. The welding wire 9 is supplied through a hose package 21 to the welding torch 7 via a first conveying device 8, where another conveying device 8 can be arranged. A wire buffer (not shown) can be arranged in the hose package 21, if need be, which can receive a certain amount of welding wire 9 in case of a backward movement of the conveying device 8 located in welding torch 7. According to the invention a database 26 is provided, in which the data of the defined parameters $P_i$ together with data of additional or further parameters $P_z$ relating to the configuration of the welding device 1 are stored together with the setpoint values $p_{set}$, determined in each case empirically, of the contact pressure or a calculation rule for calculating the respective setpoint values $p_{set}$ of the contact pressure. Database 26 is typically connected to a computing unit 27, for example a microprocessor or a computing unit already existing in the power source 2 of welding device 1. Via input/output device 18 of the welding device 1 or a separate input device provided for this purpose (not shown) the data of the defined parameters $P_i$ and the data of the additional configuration parameters $P_z$ can be entered or selected, whereupon the corresponding setpoint values $p_{set}$ of the contact pressure of the conveying rollers of the conveying devices 8 can be determined from the database 26 and can be indicated on one or more displays 28. In the embodiment shown two displays 28 are provided, which are each arranged near the conveying devices 8. The welder can read the desired value on the respective display 28 and can adjust it on the conveying devices 8.

Figure 3:
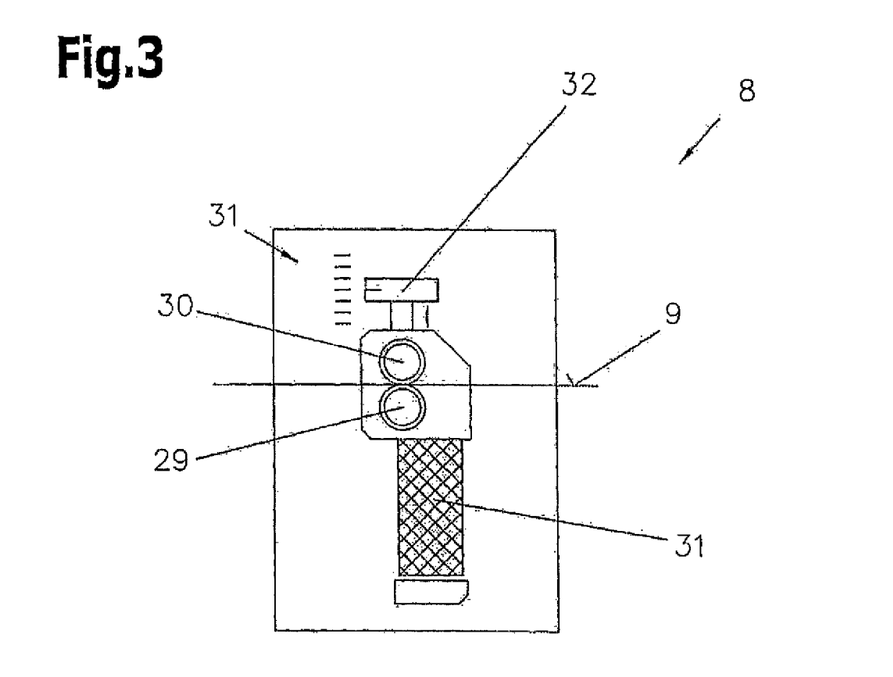
FIG. 3 is a schematic embodiment of a conveying device.

Referring to FIG. 3 an embodiment of a conveying device 8 is explained in more detail. The conveying device 8 is composed of two conveying rollers 29, 30, one conveying roller 29, the so-called driving roller, of which is driven by means of a driving motor 31. The welding wire 9 is pinched between the conveying rollers 29, 30 and is typically supplied towards welding torch 7 (not shown). In order to be able to achieve an ideal conveyance of welding wire 9 depending on the material and diameter of welding wire 9, a conveying roller 30, the so-called pressure roller is pressed against the conveying roller 29 with an accordingly desired contact pressure $p_{set}$. In order to adjust contact pressure $p_{set}$, conveying roller 30 is moved by using a corresponding adjustment element 32 towards or away from conveying roller 29. In order to be able to observe the correct adjustment, a corresponding scale 33 is typically arranged on conveying device 8. On display 28 the value that is to be adjusted on scale 33 is indicated. Also intermediate stages can be indicated on a scale 33 on the display 28 by adapting the value of the display 28 to the scale 33. For example, a single-figure display 28 of 1 to 9 can be adapted to a scale 33 of 1 to 5 such that the indicated value 1 matches the value 1 on the scale and the indicated value 9 matches the value 5 on the scale 33.

According to FIG. 2 the desired setpoint value $p_{set}$ of the contact pressure is indicated near the respective conveying device 8, whereupon the welder can adjust it by means of the adjustment element 32 on conveying device 8. Instead of two displays 28 only one display can also be provided, on which the setpoint values $p_{set}$ of contact pressure of both conveying devices 8 are indicated simultaneously or alternately. Accordingly, setpoint values $p_{set}$ of contact pressure can also be indicated centrally on welding device 1 or on power source 2. Even the time of the indication of the setpoint value $p_{set}$ of contact pressure can be adjusted. For example, the setpoint $p_{set}$ of contact pressure can be indicated, when a defined key, such as a key "threading" is pressed. Thus, in the database 26 according to the invention both all combinations or configurations of the welding device 1 and all other parameters, due to which the contact pressure to the welding wire can be influenced, are stored together with the ideal contact pressure values. Upon entry or selection the corresponding data of the defined parameters $P_i$ and additional configuration parameters $P_z$ the ideal setpoint value $p_{set}$ of conveying devices 8 is, thus, determined in a quick and error free manner and shown on displays 28. In order to facilitate the entry or selection of data of the defined parameters $P_i$ or the configuration parameters $P_z$ devices 34 for automatic identification of the data of the defined parameters $P_i$ and/or configuration parameters $P_z$ may be provided. Said identification devices 34 can for example be formed by a bar code reader. In this way, defined parameters $P_i$ or additional configuration parameters $P_z$ for example the configuration of welding device 1, can be identified automatically and can be supplied to the computing unit 27 or database 26. Finally, the database 26 or the computing unit 27 can be connected to a corresponding interface 35, via which the data of the database 26 (for example in case of a change in configuration) can be updated or supplemented. A change in configuration is for example performed when the curvature of the pipe bend of the welding torch 7, the material of the welding wire 9, the feed container (drum or coil), the length of the hose-package 21, etc. is changed. Conveying devices 8 remain unchanged, however, due to the change in configuration their load is changing, whereby the contact pressure of conveying rollers 29, 30 to the welding wire 9 needs to be adapted. Thereby it is ensured that the contact pressure is adjusted as high as absolutely necessary only, in order to not damage welding wire 9 and that, nevertheless, a safe and steady conveyance is achieved. The necessary forces the respective conveying device 8 needs to transfer to the welding wire 9 to supply the desired amount of welding wire 9 to the welding process and to overcome opposing forces—such as the break of the feed container—are, thus, resulting from the configuration. With an accurate adjustment of contact pressure the welding wire 9 is not deformed, threading of welding wire 9 is facilitated and conveying devices 8 are saved (relating to friction and heat losses) and, thus, their durability is enhanced.

In addition, by means of a measuring unit 36 the actual conveying speed of welding wire 9 can be measured. For this purpose for example the motor current $I_m$ of the driving motors 31 of the conveying devices 8 can be measured. By measuring the corresponding actual values of wire conveyance a regulation can be created and a wear, particularly of conveying rollers 29, 30 of the conveying devices 8 can be considered. If despite the adjustment of the ideal setpoint value $p_{set}$ of contact pressure a slipping through of welding wire 9 occurs what suggests a wear of conveying wires 29, 30, a correction of contact pressure $p_{set}$ can be done in certain limits. Furthermore, the actual value of wire conveyance, for example the motor current $I_m$ of drive 31 of conveying device 8, can also be compared with predetermined threshold values and in case of falling below or exceeding the threshold values an optical or audible alarm can be performed or a readjustment of contact pressure can be done.

Figure 4:
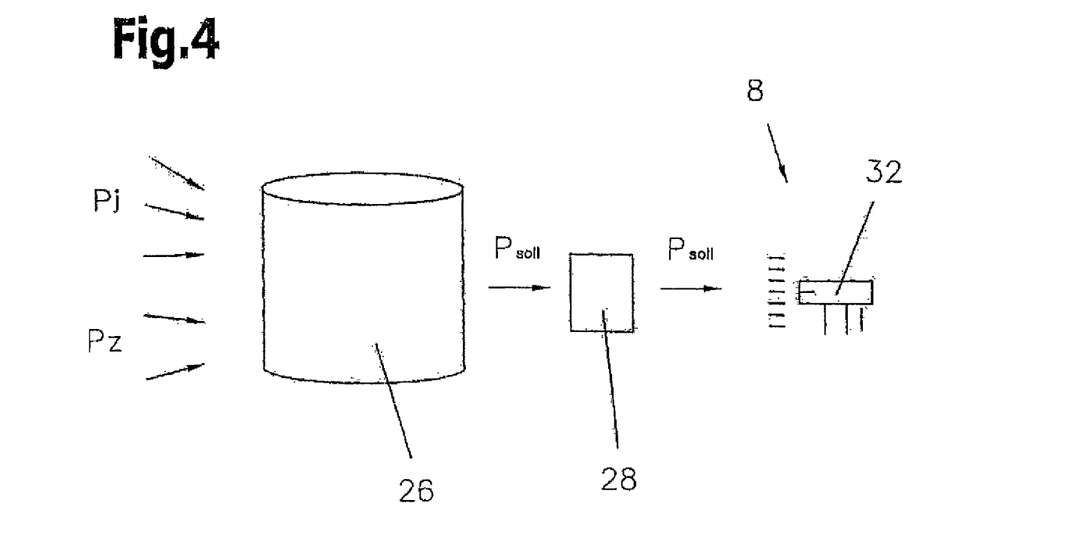
FIG. 4 is a schematic view of the method for determining the setpoint value of the contact pressure of the conveying device of a welding device.

Finally, FIG. 4 schematically shows the functioning of the present method for determining a setpoint value $p_{set}$ for the contact pressure of conveying rollers 29, 30 of at least one conveying device 8 for the conveyance of a welding wire 9 of a welding device 1. The data of the defined parameters $P_i$ together with data of additional or further parameters $P_z$ relating to the configuration of the welding device 1 are stored in a database 26 together with the setpoint values $p_{set}$, determined in each case empirically, of the contact pressure or a calculation rule for calculating the respective setpoint values $p_{set}$ of the contact pressure. The ideal setpoint value $p_{set}$ of the contact pressure is determined acccording to parameters $P_i$ and configuration parameters $P_z$ and indicated on display 28. Said value is manually adjusted by the welder by means of a corresponding adjustment element 32 on conveying device 8. Theoretically, the adjustment can also be made automatically, when the conveying device 8 has a corresponding possibility for adjustments of contact pressure. In this case the display of setpoint value $p_{set}$ of contact pressure of conveying device 8 would theoretically not necessarily be obligatory, however, it is recommended for control purposes.

The present invention is characterized by an especially accurate selection of the respective setpoint values $p_{set}$ for the contact pressure of conveying rolles 29, 30 of the conveying devices 8 and, thus, by an ideal conveyance of welding wire 9 and ideal welding quality. By using a database 26 the welder is no more required to read the values out of tables or charts in a time-consuming and error-prone manner.

In systems with several conveying devices 8 each conveying device 8 is preferably assigned a separate display 28. As seen in FIG. 2, an display 28 is arranged in welding device 1 and another display 28 is arranged in welding torch 7. However, when still further conveying devices 8 are employed, as it may for example be the case in an intermediate drive in a very long hose package 21, then an display 28 is present for each of them as well. The display 28 is preferably positioned as close to the conveying device 8 in the respective component as possible. It is advantageous when for each conveying device 8 a separate display 28 is used, because in most cases the conveying devices 8 in multi-drive systems require different pressure adjustments.

In the so-called CMT (Cold Metal Transfer) welding process for example two different conveying devices 8 are used, wherein the conveying device 8 in the welding device 1 is designed for one conveying direction and conveys the welding wire 9 towards welding torch 7, whereas the other conveying device 8 in welding torch 7 is designed for forward and backward movements. Thus, different requirements to both conveying devices 8 are resulting, so that following the identification of configuration and adjustment of parameters the setpoint values for the contact pressure of both conveying devices 8 are automatically determined and shown on displays 28. For example, a value "7" can be indicated on display 28 in welding device 1 and a value "3" can be indicated for contact pressure on display 28.

Of course in case of special welding adjustments the user is able to store said special welding adjustments together with the respective setpoint value for the contact pressure of the conveying device 8 and retrieve them for future weldings. So the user is able to make special welding adjustments, determine the corresponding values for the contact pressure of one or more conveying devices 8 by welding tests and store the entire adjustments. Thus, the user is able to store the most frequent welding adjustments for the most frequently used components.

A significant advantage of this automatic system lies in that even actual values of the contact pressure can be considered for determination of the values. For example, for the determination of the actual value the motor current of conveying device 8 can be used, and the actual value can be compared with the predetermined setpoint value and in case of a too large deviation an error message can be issued. Thus, the user can make corrections on adjustments for the next welding, where required.

The invention claimed is:

1. A method for setting a contact pressure of conveying rollers for conveying a welding wire, the method comprising steps of:

storing in a data memory
a calculation rule for calculating a setpoint value of the contact pressure based on defined parameters and configuration parameters related to a configuration of a welding device during a welding operation performed with welding wire conveyed via the conveying rollers, or defined parameters, configuration parameters, and setpoint values of the contact pressure, the defined parameters and the configuration parameters being related to a respective welding device configuration for a plurality of prior welding operations performed with welding wire conveyed via the conveying rollers, the setpoint values of the contact pressure of the conveying rollers on the welding wire being determined when said prior welding operations occur at said defined parameters and in said welding device configurations;

performing a welding operation with welding wire conveyed via the conveying rollers;

indicating, for the welding operation and on a display, a setpoint value, the setpoint value being
calculated by a microprocessor based on the defined parameters and the configuration parameters for said welding operation, the microprocessor using the calculation rule from the data memory to perform said calculating, or
from the database and corresponding to the defined parameters and the configuration parameters for said welding operation; and adjusting the contact pressure during said welding operation to said setpoint value indicated on said display.

2. The method according to claim 1, wherein the defined parameters and/or the configuration parameters of said welding operation are entered or selected via an input device.

3. The method according to claim 1, wherein the defined parameters and/or the configuration parameters of said welding operation are identified automatically.

4. The method according to claim 1, wherein the defined parameters of said further welding operation comprise a material and a diameter of the welding wire.

5. The method according to claim 4, wherein the defined parameters of said welding operation comprise a type of the conveying rollers of the conveying device.

6. A The method according to claim 1, wherein the configuration parameters for said welding operation comprise a number and positions of conveying devices, a type, a number and a length of hose packages for guiding the welding wire and/or a type of conveying devices.

7. The method according to claim 1, further comprising steps of:
measuring a conveying speed of the welding wire during said welding operation; and
correcting said setpoint value of said welding operation based on said conveying speed.

8. The method according to claim 7, further comprising a step of:
optically or audibly indicating a warning when the conveying speed exceeds or falls below a threshold value.

9. The method according to claim 1, the adjusting of said contact pressure occurs automatically.

10. The method according to claim 1, wherein the setpoint value indicated on the display is a value between 0 and 9.

11. A welding device comprising:
at least one conveying device comprising conveying rollers for conveying a welding wire,
an adjustment device configured to adjust a contact pressure of the conveying rollers, the conveying rollers contacting the welding wire at said contact pressure,
a data memory configured to store defined parameters, configuration parameters related to configurations of the welding device, and setpoint values for said contact pressure based on said defined welding parameters and said configuration parameters,
a display configured to display a setpoint value for a welding operation, the setpoint value being one of the setpoint values and being based on defined parameters and configuration parameters for the welding operation, and
a microprocessor configured to calculate a setpoint value of the contact pressure from the defined parameters and the configuration parameters for said welding operation, said microprocessor using a calculation rule to perform said calculating;
wherein said data memory is further configured to store said calculation rule; and
wherein said display is further configured to indicate said setpoint value calculated by said microprocessor.

12. The welding device according to claim 11, further comprising an input device connected to the data memory and configured to allow entry or selection of the defined parameters and/or the configuration parameters.

13. The welding device according to claim 11, further comprising an identification device connected to said data memory and configured to automatically identify the defined parameters and/or the configuration parameters.

14. The welding device according to claim 13, wherein the identification device comprises a barcode reader.

15. A welding device according to claim 11, wherein a material and a diameter of the welding wire and a type of the conveying rollers of the conveying device can be stored in the data memory as defined parameters.

16. A welding device according to claim 11, wherein a number and positions of the conveying devices, a type, a number, and a length of hose packages for guiding the welding wire and/or a type of the at least one conveying device are stored in the data memory as configuration parameters.

17. The welding device according to claim 11, further comprising a speed sensor configured to measure a conveying speed of the welding wire.

18. The welding device according to claim 17, further comprising an optical or audible indicating device configured to indicate if the conveying speed exceeds or falls below threshold values.

19. The welding device according to claim 11, wherein the at least one conveying device is configured to automatically adjust the contact pressure.

20. The welding device according to claim 11, further comprising an interface connected to the data memory.

21. A The welding device according to claim 11, wherein the display comprises a single-figure seven-segment display.

* * * * *